United States Patent
Ito et al.

(10) Patent No.: US 6,845,379 B2
(45) Date of Patent: Jan. 18, 2005

(54) SOUND DATA PROCESSING SYSTEM AND PROCESSING METHOD

(75) Inventors: Fumiaki Ito, Kanagawa (JP); Yuji Ikeda, Kanagawa (JP); Takaya Ueda, Kanagawa (JP); Kenichi Fujii, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 547 days.

(21) Appl. No.: 09/817,302

(22) Filed: Mar. 27, 2001

(65) Prior Publication Data

US 2001/0029540 A1 Oct. 11, 2001

(30) Foreign Application Priority Data

Mar. 30, 2000 (JP) ........................................ 2000-095350

(51) Int. Cl.⁷ ............................................... G06F 17/30
(52) U.S. Cl. .................... 707/102; 707/10; 707/101; 707/103; 707/104
(58) Field of Search ................................. 707/100, 102, 707/104, 200, 10, 101, 103; 430/140; 382/100

(56) References Cited

U.S. PATENT DOCUMENTS 6,180,312 B1 * 1/2001 Edwards ..................... 430/140
6,408,301 B1 * 6/2002 Patton et al. ................ 707/102
6,523,046 B2 * 2/2003 Liu et al. .................. 707/104.1
6,611,607 B1 * 8/2003 Davis et al. ................. 382/100

FOREIGN PATENT DOCUMENTS

| JP | 62-155546 | 7/1987 |
|----|-----------|--------|
| JP | 63-146647 | 6/1988 |
| JP | 3-158047 | 7/1991 |
| JP | 4-334240 | 11/1992 |
| JP | 5-31432 | 2/1993 |
| JP | 5-91169 | 4/1993 |
| JP | 7-307773 | 11/1995 |
| JP | 9-181797 | 7/1997 |
| JP | 9-321844 | 12/1997 |

OTHER PUBLICATIONS

Min et al., "Infrastructure and method for supporting generic multimedia metadata", U.S. patent application Pubblication, Aug. 2002, pp. 1–23.*

* cited by examiner

Primary Examiner—Thuy Pardo

(57) ABSTRACT

In a sound data setting apparatus for setting an output format of each sound to output sounds corresponding to a plurality of sound data, metadata indicating contents of each sound data is acquired and an output format of a sound concerning the sound data corresponding to the metadata is set on the basis of each metadata.

42 Claims, 12 Drawing Sheets

FIG. 6

```xml
<?xml version="1.0"?>
<metadata>
    <source>
        <url>http://raito/program1</url>
        <type>radio</type>
        <data>stream</data>
        <control>disable</control>
    </source>
    <content>
        <type>music</type>
        <length>15min.</length>
    </content>
</metadata>
```

FIG. 7

```
<?xml version="1.0"?>
<metadata>
    <source>
        <url>http://scheduler/</url>
        <type>scheduler</type>
        <data>stream</data>
        <control>enable</control>
    </source>
    <content>
        <type>voice</type>
        <length>20sec.</length>
    </content>
</metadata>
```

FIG. 9

| | |
|---|---|
| http://raito/program1 | 13:40:15 JANUARY 1ST, 2000 |
| http://scheduler/ | 13:42:23 JANUARY 1ST, 2000 |

| 1101 | 1102 | 1103 |
|---|---|---|
| content. type | music | 0.5 |
| content. type | voice | 1.0 |

SOUND DATA PROCESSING SYSTEM AND PROCESSING METHOD

FIELD OF THE INVENTION

The present invention relates to sound data processing and, more particularly, to sound data processing suited to processing of sound data pertaining to each of a plurality of sounds required to be output at substantially the same time.

BACKGROUND OF THE INVENTION

As an apparatus which makes sounds of a plurality of sources audible in parallel, an apparatus which switches or superposes the sound of an audio playback device and the sound of a communication device such as a portable telephone has been conventionally proposed.

For example, prior-art inventions which, when an incoming call arrives at a portable telephone or a pager while the user is listening to music by, e.g., a headphone stereo, inform the user of the arrival of the incoming call are proposed in Japanese Utility Model Laid-Open No. 62-155546, Japanese Patent Laid-Open Nos. 63-146647, 03-158047, and 04-334240, Japanese Utility Model Laid-Open No. 05-031432, and Japanese Patent Laid-Open Nos. 05-091169, 07-307773, 09-181797, and 09-321844.

The prior-art inventions described in these references are different in the connection mechanism between the audio playback device and the portable telephone and the method of performing switching or superposition. However, any of these inventions switches the sound from the audio playback device to the call incoming notification sound or speech communication sound from the communication device, or superposes the latter sound on the former sound. Any of these apparatuses automatically switches or superposes the sounds when an incoming call arrives at the communication device.

For example, the sound output data generating apparatus proposed in Japanese Patent Laid-Open No. 05-091169 is connected to an audio playback device and a communication device. When an incoming call arrives at the communication device, this apparatus decreases (mutes) the sound output level of the audio playback device to 0 and outputs a call incoming notification sound or speech communication sound.

The sound output data generating apparatuses proposed in Japanese Utility Model Laid-Open No. 62-155546 and Japanese Patent Laid-Open Nos. 63-146647 and 03-158047 are functionally analogous to the above apparatus, except that an audio playback module and a communication module are integrated.

The sound output data generating apparatus proposed in Japanese Utility Model No. 05-031432 has a communication function capable of connecting an audio playback device. When an incoming call arrives at a communication module of the sound output data generating apparatus, the apparatus mixes a call incoming notification sound and speech communication sound with the sound from the audio playback device, and outputs the mixed sound. In mixing the speech communication sound, the apparatus decreases the sound level of the audio playback device to a predetermined value or lower, so as not to interfere with the speech communication.

The sound output data generating apparatuses proposed in Japanese Patent Laid-Open Nos. 07-307773, 09-181797, and 09-321844 superpose a call incoming notification sound and speech communication sound on an audio sound by using one or both of muting and mixing. Although Japanese Patent Laid-Open No. 04-334240 has a similar arrangement except that an audio system and a communication device are integrated. Therefore, to output the sound of the communication device, the tape of the audio system can be stopped.

In any of the above prior arts, sound sources are predetermined sources, e.g., an output from an audio device and a call incoming notification or the contents of speech communication of a communication device. Also, the settings of an output format such as switching or superposition of a plurality of sounds are predetermined in accordance with each source.

Recently, however, sources are more and more digitized, so sounds can be supplied from a wide variety of sources across networks. Therefore, various sound sources are present in addition to audio outputs and a call incoming notification and speech communication to a communication device. So, the degree of freedom of the combination of these sound sources is large. For example, a user can listen to music data acquired across networks, listen to sound broadcasting, have speech communication with the other party, and listen to notifications, such as an e-mail reception notification, from various applications on various devices or computers. That is, diverse sound sources exist.

Accordingly, if output formats such as switching and superposition of a plurality of sounds are set on the basis of the combinations of individual sources, sounds from unexpected sources cannot be processed.

Also, even the sound from the same source has various contents. So, if sound output formats are set on the basis of the combinations of individual sources, it is difficult to output a sound corresponding to the content.

SUMMARY OF THE INVENTION

It is a principal object of the present invention to provide a sound data processing technology capable of setting an output format corresponding to the contents of a sound regardless of the type of the sound source.

According to the present invention, there is provided a sound data setting apparatus for setting an output format of each sound to output sounds corresponding to a plurality of sound data, comprising:

acquiring means for acquiring metadata indicating contents of each sound data; and setting means for setting, on the basis of each metadata, an output format of a sound concerning the sound data corresponding to the metadata.

According to the present invention, there is provided a sound data generating apparatus for generating sound data to output sounds corresponding to a plurality of sound data by a predetermined output format, comprising:

acquiring means for acquiring metadata indicating contents of each sound data;

setting means for setting, on the basis of each metadata, an output format of a sound concerning the sound data corresponding to the metadata; and means for generating new sound data from each sound data on the basis of the set output format.

According to the present invention, there is provided a sound data setting method of setting an output format of each sound to output sounds corresponding to a plurality of sound data, comprising:

the acquisition step of acquiring metadata indicating contents of each sound data; and the setting step of setting, on the basis of each metadata, an output format of a sound concerning the sound data corresponding to the metadata.

According to the present invention, there is provided a sound data generating method of generating sound data to output sounds corresponding to a plurality of sound data by a predetermined output format, comprising:

the acquisition step of acquiring metadata indicating contents of each sound data;

the setting step of setting, on the basis of each metadata, an output format of a sound concerning the sound data corresponding to the metadata; and the step of generating new sound data from each sound data on the basis of the set output format.

According to the present invention, there is provided a recording medium recording a program, for setting an output format of each sound to output sounds corresponding to a plurality of sound data, allowing a computer to function as:

acquiring means for acquiring metadata indicating contents of each sound data; and setting means for setting, on the basis of each metadata, the output format of a sound concerning the sound data corresponding to the metadata.

According to the present invention, there is provided a recording medium recording a program, for generating sound data to output sounds corresponding to a plurality of sound data by a predetermined output format, allowing a computer to function as:

acquiring means for acquiring metadata indicating contents of each sound data;

setting means for setting, on the basis of each metadata, an output format of a sound concerning the sound data corresponding to the metadata; and means for generating new sound data from each sound data on the basis of the set output format.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view showing a practical example of metadata;

FIG. 7 is a view showing another practical example of metadata;

FIG. 9 is a view showing the configuration of schedule data held in an output format holding unit 804;

FIG. 11 is a view showing the configuration of data held in a rule holding unit 1003.

DETAILED DESCRIPTION OF THE PREFERRED EMBODIMENTS

Preferred embodiments of the present invention will now be described in detail in accordance with the accompanying drawings.

<First Embodiment>

Figure 1:
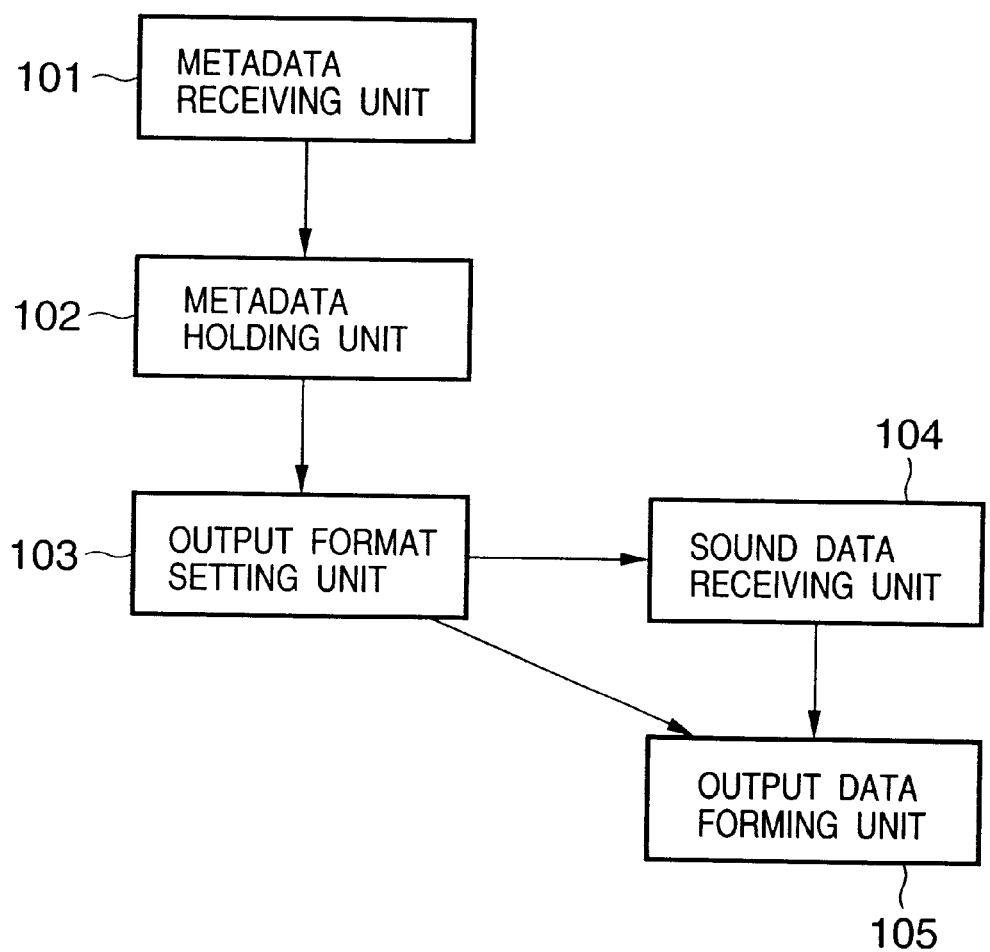
FIG. 1 is a block diagram showing the basic configuration of a sound data generating apparatus according to the first embodiment of the present invention.

FIG. 1 is a block diagram showing the basic configuration of a sound data generating apparatus according to the first embodiment of the present invention.

Referring to FIG. 1, a metadata receiving unit 101 receives metadata describing the contents of sound data. A metadata holding unit 102 holds the metadata received by the metadata receiving unit 101. An output format setting unit 103 uses each metadata held in the metadata holding unit 102 to set the output format of the corresponding sound data. A sound data receiving unit 104 receives sound data on the basis of the output format determined by the output format setting unit 103. An output data forming unit 105 forms output data by selecting and superposing, as needed, the sound data received by the sound data receiving unit 104, on the basis of the output format determined by the output format setting unit 103.

Figure 2:
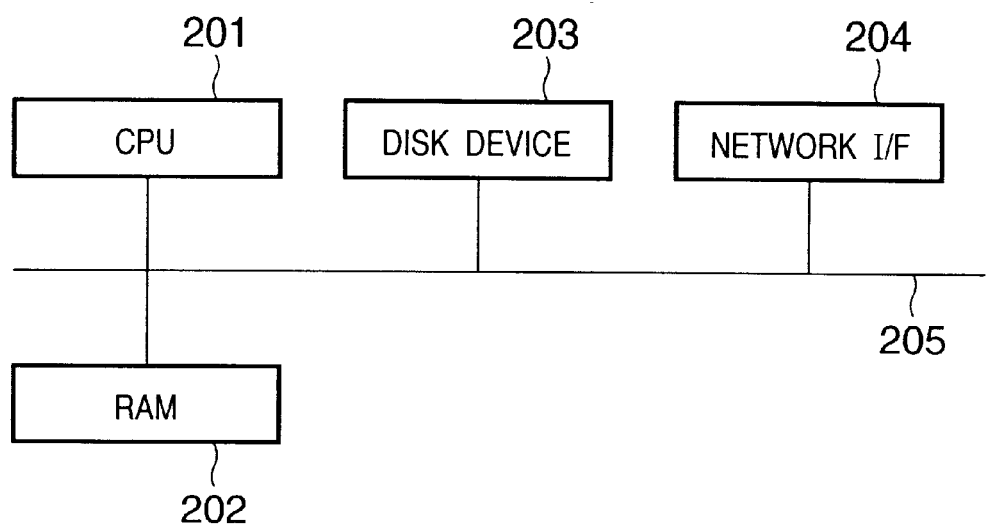
FIG. 2 is a view showing the configuration of hardware by which the sound data generating apparatus according to preferred embodiments of the present invention is functionally implemented.

FIG. 2 is a view showing the configuration of hardware by which the above sound data generating apparatus is functionally implemented.

Referring to FIG. 2, a CPU 201 operates in accordance with programs which realize procedures to be described later. A RAM 202 provides an area for saving metadata or sound data and an area necessary for the operations of the programs. A disk device 203 holds the programs for realizing the procedures to be described later. A network interface 204 accomplishes reception of metadata and sound data transmitted from other devices across a network. These components are connected by a bus 205. This configuration can, of course, be used in the second to fourth embodiments to be described later.

The procedure of an output format setting process executed by the above sound data generating apparatus will be described below with reference to a flow chart in FIG. 3.

First, in step S301, the CPU 201 checks whether new metadata is held in the metadata holding unit 102. If new metadata arrives at the metadata receiving unit 101 via the network interface, the metadata receiving unit 101 independently performs a process of holding this metadata into the metadata holding unit 102. If no new metadata is held, the CPU 201 repeats step S301. During the repetition, the process can be interrupted for a predetermined time. If new metadata is held, the flow advances to step S302.

Note that metadata is transmitted to the apparatus of this embodiment from an arbitrary apparatus coupled across the network. For example, when a user selects a program by using an apparatus for selecting programs of Internet radio, metadata of that program is transmitted to the apparatus of this embodiment. Also, when the apparatus of this embodiment is implemented as a computer for executing another application, metadata may be supplied from the application.

FIG. 6 shows an example of this metadata. The metadata shown in FIG. 6 is described in XML language, and the meanings are as follows. First, the source of sound data of this program can be accessed by "http://radio/program1". The type of the sound source is a radio program, the format of the sound data is a stream, and the start and stop of playback cannot be controlled. Also, the type of the sound is music, and the length is 15 min.

FIG. 7 shows an example of another metadata. This is an example of metadata which an apparatus for performing schedule management transmits to the apparatus of this embodiment to send a message for calling user's attention when an appointment start time is near. The meanings are as follows. First, the source of sound data of this message can be accessed by "http://schedular/". The type of the sound source is a scheduler, the format of the sound data is a stream, and the start and stop of playback can be controlled. Also, the type of the sound is a voice, and the length is 20 sec.

In step S302, the CPU 201 determines the combination of sound data to be output, from the metadata held in the metadata holding unit 102. For example, if the types of sounds are music and a voice, combinations can be determined in accordance with the following rules.

(1) If only one metadata is held in the metadata holding unit 102, i.e., if no sound has been output so far, new sound data is directly output by a gain of 1.

(2) If two metadata are held in the metadata holding unit 102 and the types of sounds are music and a voice, the sound data of the music and the sound data of the voice are superposed by gains of 0.5 and 1, respectively.

(3) If two or more metadata are held in the metadata holding unit 102 and a plurality of metadata have the same sound type, these sounds are switched before being output. For example, the output of a sound pertaining to sound data which has been output is stopped, and a sound concerning sound data indicated by newly held metadata is output by the same gain as the sound whose output is stopped. Metadata of the sound data whose output is stopped is erased from the metadata holding unit 102.

As an example, if the metadata in FIG. 7 is received while sound data indicated by the metadata in FIG. 6 is output, the gain of the sound data indicated by the metadata in FIG. 6 is lowered to 0.5, and sound data indicated by the metadata in FIG. 7 is output by a gain of 1.

These rules can be arbitrarily set.

In step S303, the CPU 201 newly generates a thread for receiving sound data, which is to be newly output, from its source. More specifically, the CPU 201 transfers URL data indicating the source of the sound in the metadata and newly generates a thread for acquiring stream data from this URL data. Also, for sound data whose output is to be stopped, the CPU 201 terminates a thread which has received the sound data from its source. The flow advances to step S304.

In step S304, the CPU 201 informs the output data forming unit 105 of the new output format determined in step S303. More specifically, the CPU 201 informs the output data forming unit 105 of a buffer for holding PCM data by which the newly generated thread acquires and converts stream data, and data of the gain at which this PCM data held in the buffer is to be output. The flow returns to step S301.

A sound data receiving process will be described below with reference to a flow chart in FIG. 4. This process is executed in the thread activated in step S303 described above.

First, the CPU 201 performs initialization in step S401. The CPU 201 establishes a connection to the source and requests the source to transmit sound data. The flow advances to step S402.

In step S402, the CPU 201 receives a sound data packet corresponding to the unit of processing from the source. The flow advances to step S403.

In step S403, the CPU 201 checks whether the sound data from the source is completed. If the data is completed, the flow advances to step S406; if not, the step advances to step S404.

In step S404, the CPU 201 converts the received packet into a PCM code having a predetermined number of bits and a predetermined sampling rate. Although various encoding schemes can be used for sound data from a source, any encoding scheme can convert data into a PCM code having a certain time length. The flow advances to step S405.

In step S405, the CPU 201 saves the PCM data obtained by the conversion in step S404 into the buffer. The flow returns to step S402, and the CPU 201 processes the next packet.

In step S406, the CPU 201 performs a termination process. That is, the CPU 201 holds data indicating that the data is completed into the buffer, and terminates the thread that has performed this processing.

Figure 5:
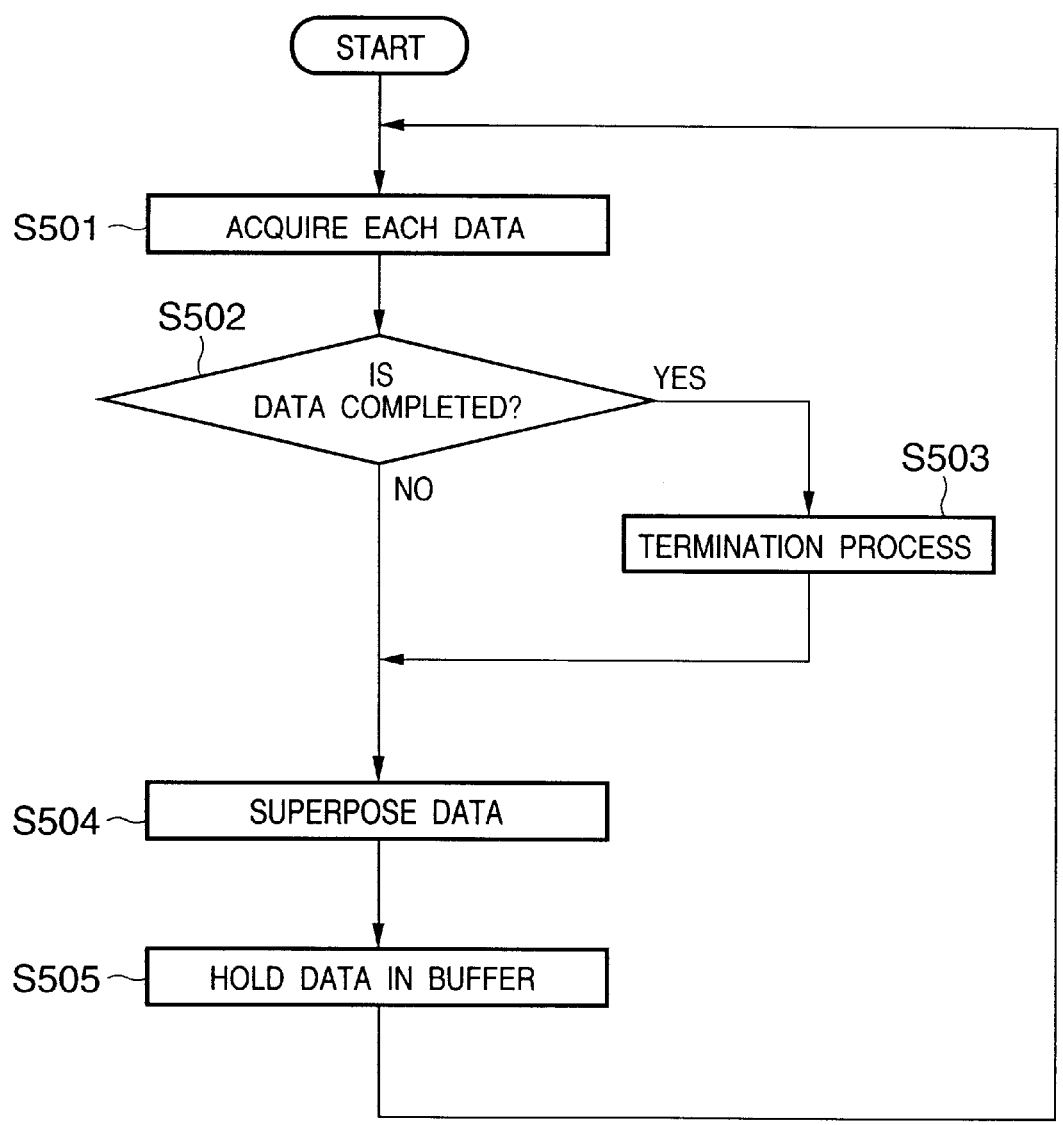
FIG. 5 is a flow chart showing an outline of an output data forming process.

An output data formation process will be described below with reference to a flow chart in FIG. 5.

First, in step S501, the CPU 201 acquires PCM data having a predetermined time length from each buffer notified by the output format setting unit 103. This buffer is a ring buffer, and an area occupied by the acquired data is used for newly acquired data. The flow advances to step S502.

In step S502, the CPU 201 checks whether the data in the buffer contains data indicating termination. If any data is completed, the flow advances to step S503. If no sound data is completed, the flow advances to step S504.

In step S503, the CPU 201 erases metadata of the completed sound data from the metadata holding unit 102. The flow advances to step S504.

In step S504, the CPU 201 multiplies each data extracted in step S501 by the gain notified by the output format setting unit 103, and calculates the sum of these data to form output data. The flow advances to step S505.

In step S505, the CPU 201 holds the output data of a predetermined time length formed in step S504 into the output buffer. The flow returns to step S501.

The sound data thus stored in the output buffer is read out from another sound output apparatus, D/A-converted, and given to a user as a sound from a sound output means such as a headphone.

In the sound data generating apparatus of this embodiment as described above, an output format is determined by using metadata of each sound data. Therefore, any output format corresponding to the contents of sound data can be set regardless of the type of the source of the sound data.

In the above embodiment, metadata items are the source of sound data, type of sound source, format of sound data, controllability of playback start, content type of sound data, and length of sound data. However, these items are merely examples, so some other items can also be used. Examples are the sender of sound data, the degree of importance of sound data, a keyword indicating the contents of sound data, and the speaker type (e.g., a female or a male) of a voice. Also, values given to these metadata items are not restricted to those of the above embodiment. For example, the type of sound source can take a value indicating an arbitrary data source type such as a television, CD, or telephone, and the type of sound can include a warning sound in addition to music and a voice.

Furthermore, output formats need not be set on the basis of all metadata items, and they can be set on the basis of some items. Also, an output format need not be determined on the basis of the same items for each metadata; an output format can be set on the basis of different items for each metadata.

In the above embodiment, switching and superposition of sounds or the output level of superposition is determined in accordance with the types of the sounds. However, the present invention is not limited to this method.

Additionally, in the above embodiment, sound output is immediately started when metadata is received, and, if sound data which has been output so far has the same content type, this output is immediately stopped. However, new sound data can also be output after sound output currently being executed is completed. Alternatively, it is possible to output new sound data by temporarily interrupting sound output currently being executed, and restart the output of the original sound data after that. That is, various superposition and scheduling methods and their combinations can be used.

<Second Embodiment>

Figure 8:
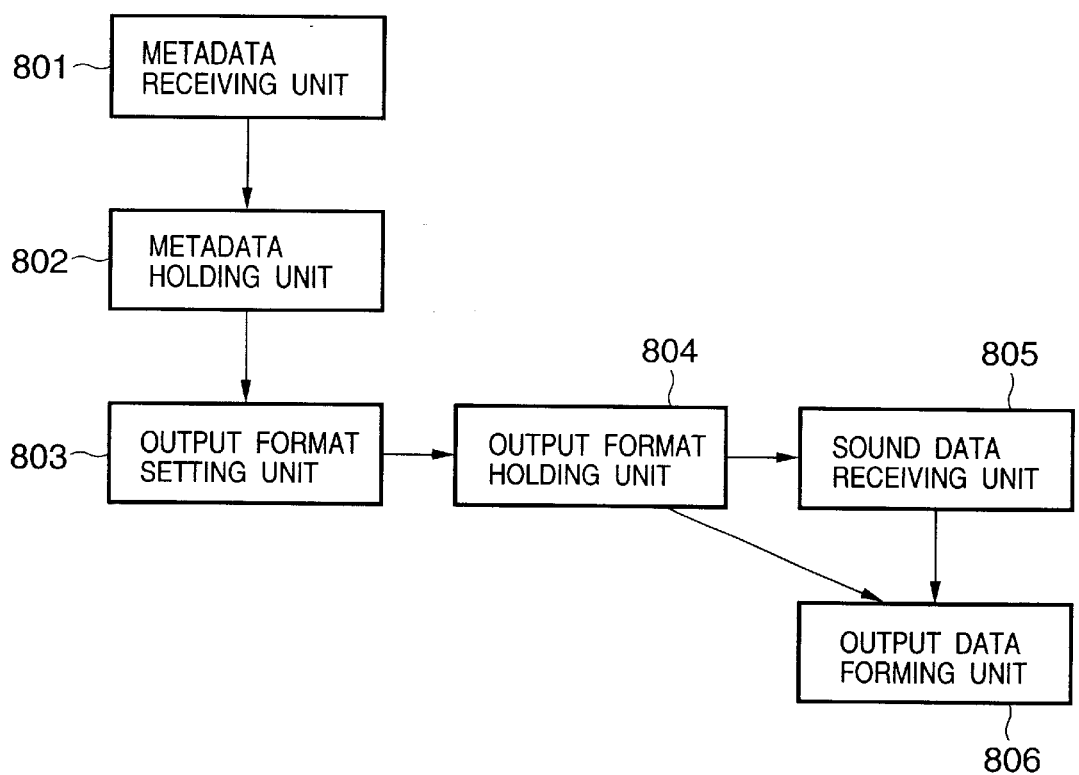
FIG. 8 is a block diagram showing the basic configuration of a sound data generating apparatus according to the second embodiment of the present invention.

To perform sound data scheduling as well, an arrangement shown in FIG. 8 can also be used. FIG. 8 is a block diagram showing the basic configuration of a sound data generating apparatus according to the second embodiment of the present invention.

Referring to FIG. 8, a metadata receiving unit 801 receives metadata describing the contents of sound data. A metadata holding unit 802 holds the metadata received by the metadata receiving unit 801. An output format setting unit 803 sets the output format, including an output schedule, of a sound by using each metadata held in the metadata holding unit 802. An output format holding unit 804 holds the output format including an output schedule determined by the output format setting unit 803. A sound data receiving unit 805 receives sound data on the basis of the schedule held in the output format holding unit 804. An output data forming unit 806 forms output data by selecting and superposing, as needed, the sound data received by the sound data receiving unit 805, on the basis of the schedule held in the output format holding unit 804.

Figure 3:
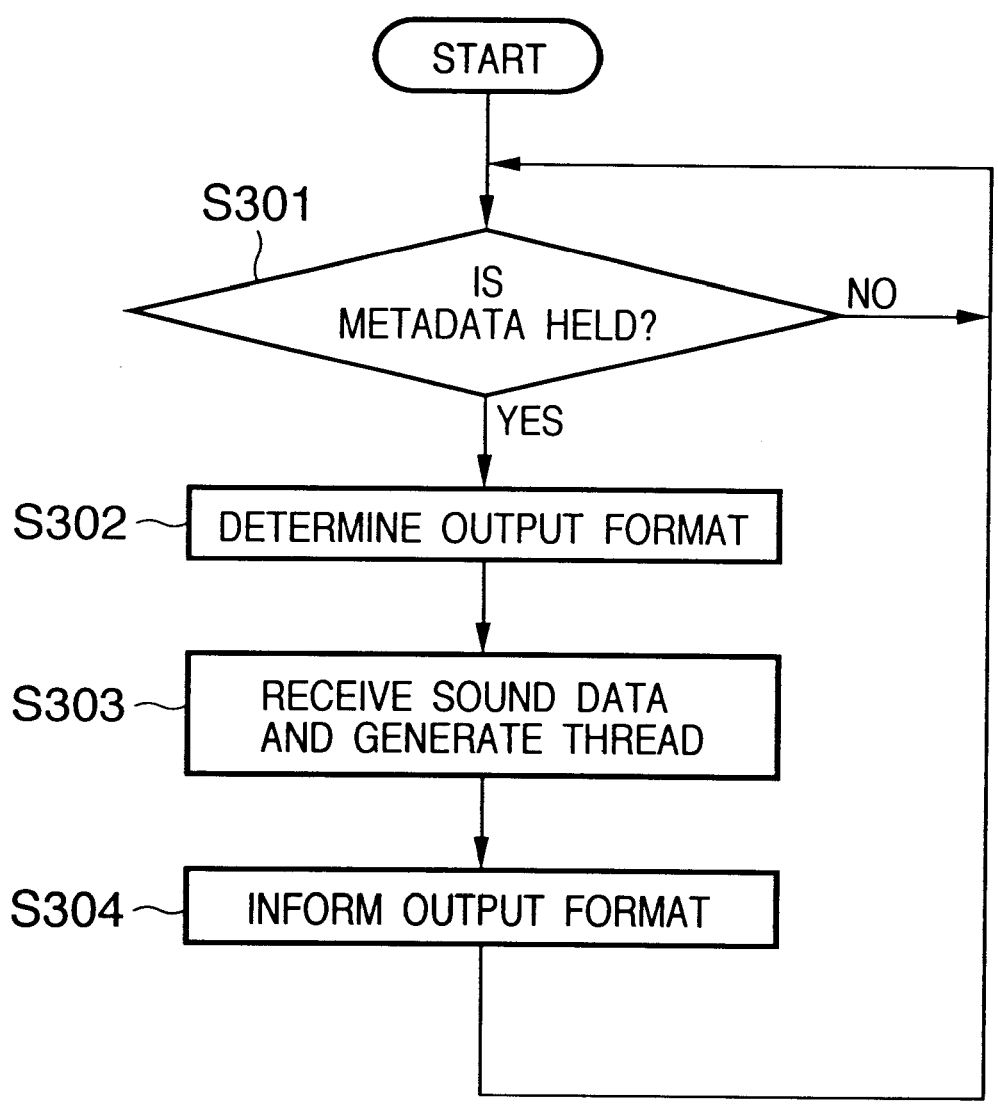
FIG. 3 is a flow chart showing an outline of an output format setting process.

In this embodiment, a process of holding an output format in the output format holding unit 804 is performed instead of the output format determination process explained in steps S303 and S304 of FIG. 3. FIG. 9 is a view showing the configuration of schedule data held in the output format holding unit 804.

Referring to FIG. 9, each row is data for holding a schedule concerning one sound data. Each field of a column 901 holds a URL character string indicating the source of sound data. Each field of a column 902 holds the output start time of the sound data. However, it is preferable to hold integral values indicating times, rather than to hold character strings as shown in FIG. 9.

Figure 4:
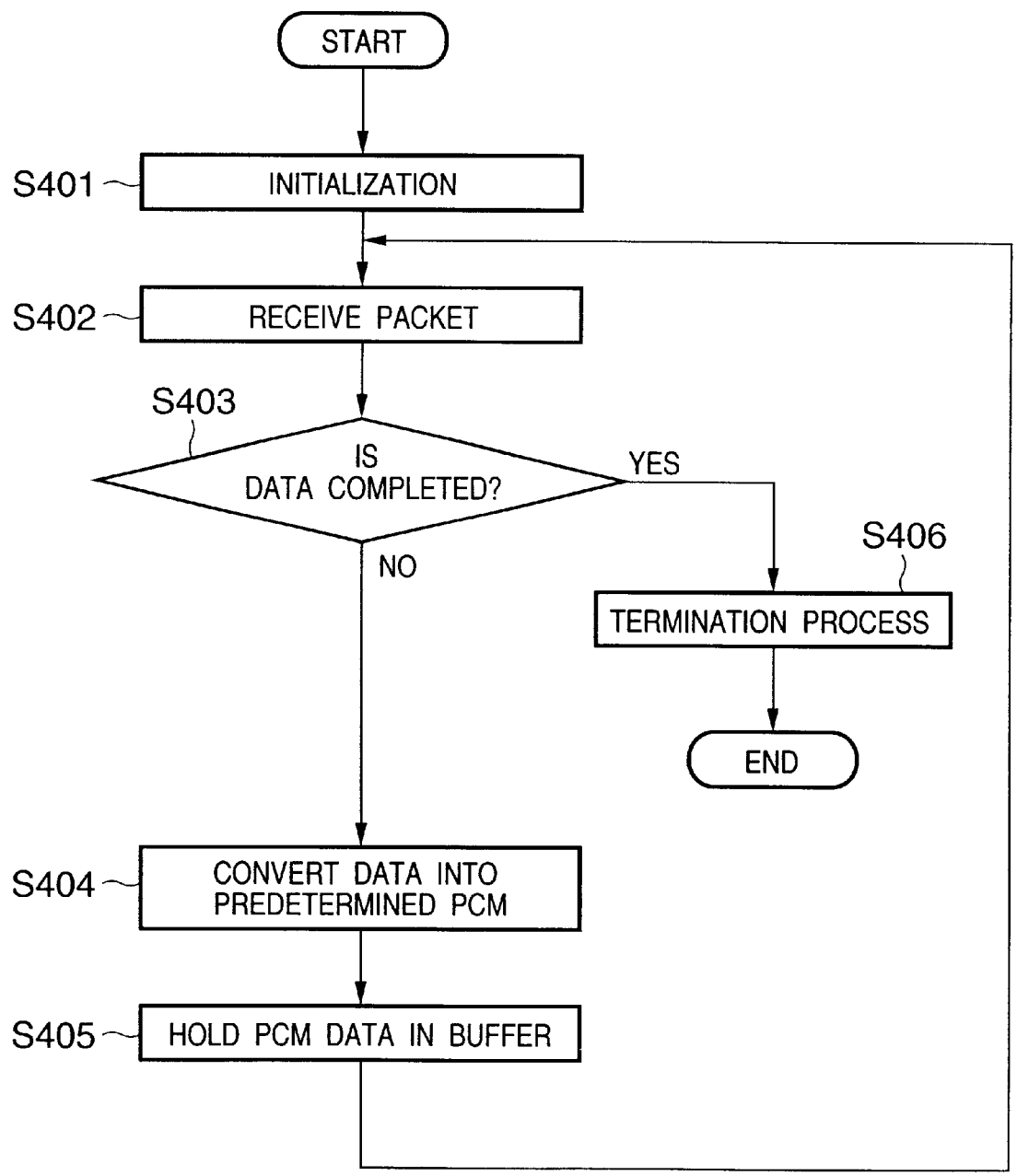
FIG. 4 is a flow chart showing an outline of a sound data receiving process.

When the output start time of any sound data held in the output format holding unit 804 has come, a thread for performing the sound data receiving process explained in FIG. 4 is activated. Also, sound data to be newly acquired is added to an object of the output data formation process explained in FIG. 5.

An area for holding data indicating an output restart time can also be formed in the output format holding unit 804. In this case, the output restart time of sound data whose interruption is designated can be held, and the output of the data can be restarted when this output restart time is reached.

Furthermore, it is possible to form, in the output format holding unit 804, an area for holding data indicating the time at which the output gain is changed and also indicating the value of the gain, and change the gain when the time has come. For example, the output gain of certain sound data is set to 0 while another sound data is output, and returned to 1 at the time the output of the other sound data is completed. In this manner, the former sound can be muted while the latter sound data is being output.

In the above embodiment, an output format is changed when metadata is newly received. However, a process of changing an output format can also be performed when sound data currently being output is completed or at a predetermined or arbitrary time interval.

Also, in the above embodiment, rules for determining an output format from metadata need not be unique to the apparatus. That is, these rules can be appropriately changed.

<Third Embodiment>

Figure 10:
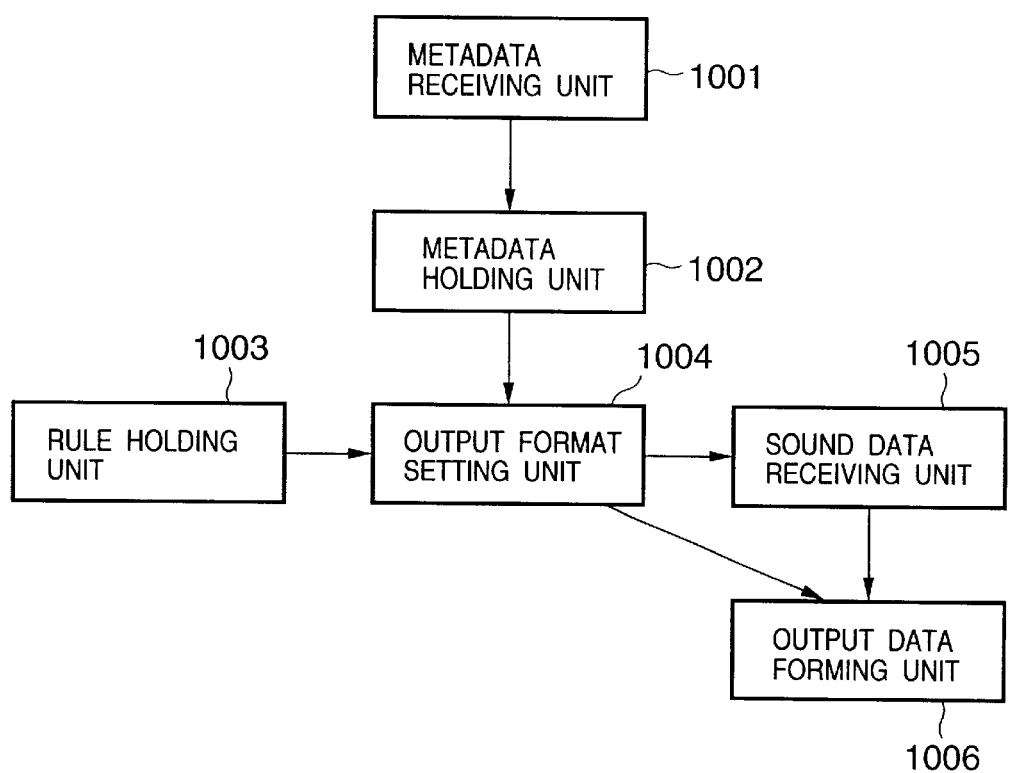
FIG. 10 is a block diagram showing the basic configuration of a sound data generating apparatus according to the third embodiment of the present invention.

FIG. 10 is a block diagram showing the basic configuration of a sound data generating apparatus as the third embodiment of the present invention, when rules for setting an output format are separately held.

Referring to FIG. 10, a metadata receiving unit 1001 receives metadata describing the contents of sound data. A metadata holding unit 1002 holds the metadata received by the metadata receiving unit 1001. A rule holding unit 1003 holds rules for determining an output format. An output format setting unit 1004 sets the output format of a sound by using each metadata held in the metadata holding unit 1002, in accordance with the rules held in the rule holding unit 1003. A sound data receiving unit 1005 receives sound data on the basis of the output format determined by the output format setting unit 1004. An output data forming unit 1006 forms output data by selecting and superposing, if needed, the sound data received by the sound data receiving unit 1005, on the basis of the output format determined by the output format setting unit 1004.

FIG. 11 is a view showing the configuration of data in the rule holding unit 1003 for holding the rules for determining gains when a plurality of sound data are to be output.

Referring to FIG. 11, each row is data expressing one rule. Each field of a column 1101 holds a character string indicating a tag name. Each field of a column 1102 holds a character string indicating a value. Each field of a column 1103 holds a numerical value indicating the gain. This data expresses that in meta data of sound data, if the value of an element having the same tag as the tag name held in the column 1101 is the same as the value held in the column 1101, the value held in the column 1103 is used as the gain. In the example of FIG. 11, the operation is the same as the embodiment, described previously. However, if the value in the column 1103 of the first row is changed to 0, the output of music data is muted.

In the above embodiment, the rules held in the rule holding unit 1003 can also be arbitrarily changed by a user. When this is the case, e.g., when the rule holding unit 1003 is implemented by a disk device, files holding these rules are exchanged. In this way, rules congenial to the taste of the user can be set. For example, the method of selection and superposition of sound data can be set in accordance with the taste of the user.

<Fourth Embodiment>

In the above third embodiment, only metadata is received, and sound data is received where necessary. However, metadata and sound data can also be received at the same time. The arrangement of an apparatus for processing integrated data of sound data and metadata will be described below with reference to FIG. 12.

Figure 12:
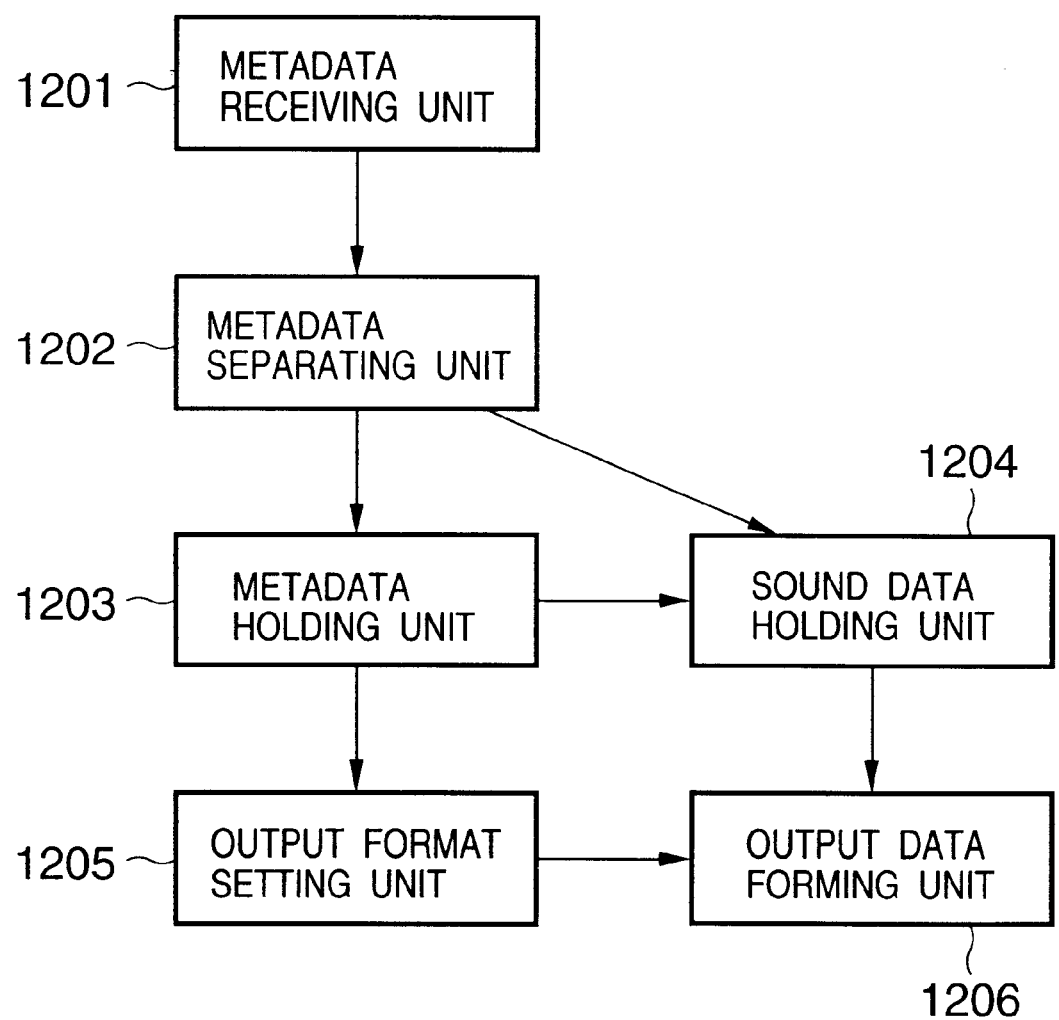
FIG. 12 is a block diagram showing the basic configuration of a sound data generating apparatus according to the fourth embodiment of the present invention.

FIG. 12 is a block diagram showing the basic configuration of a sound data generating apparatus for processing integrated data of metadata and sound data, as the fourth embodiment of the present invention.

Referring to FIG. 12, a metadata receiving unit 1201 receives integrated data of sound data and metadata.

A metadata separating unit 1202 separates the data received by the metadata receiving unit 1201 into metadata and sound data. A metadata holding unit 1203 holds the metadata separated by the metadata separating unit 1202. A sound data holding unit 1204 holds the sound data separated by the metadata separating unit 1202. An output format setting unit 1205 determines the output format of a sound by using each metadata held in the metadata holding unit 1203. An output data forming unit 1206 forms output data by selecting and superposing, as needed, the sound data held in the sound data holding unit 1206, on the basis of the output format determined by the output format setting unit 1205.

An example of integrated data of sound data and metadata is data having a tag containing sound data itself, instead of a URL indicating the sound source of the data shown in FIG. 6 or 7. This data can be easily separated into the sound data and metadata by referring to the tag. The rest of the processing is the same as the above embodiment.

<Other Embodiment>

In the above embodiments, when a plurality of sound data are to be superposed, they are simply superposed. However, in the case of stereo output or 3D output, it is also possible to use a superposition method by which the position of a sound source is changed for each sound data. In this method, the position of a sound source can also be determined by using metadata.

In the above embodiments, output sound data formed by the output data forming unit 105 is stored in the buffer. However, another processing can also be performed. For example, the output sound data can be transmitted to another sound output apparatus across the network.

In the above embodiments, output sound data formed by the output data forming unit 105 is simply stored in the buffer. However, sounds may be output by equipping the above sound data generating apparatus with a D/A converter and a loudspeaker. Alternatively, it may be possible to connect another sound output apparatus by using a D/A converter and an analog sound signal output terminal and transmit an analog sound signal to that sound output apparatus.

In the above embodiments, all sound data are digital data. However, some or all of sound data may also be analog data. When this is the case, the output data forming unit 105 may be implemented by a circuit which superposes analog signals, rather than calculate digital data.

In the above embodiments, sound data is stream data. However, any arbitrary sound data may be used. That is, sound data may be acquired at once. Also, sound data need not be received from the network, but may be stored in a sound data storage device (e.g., a hard disk device) in the same apparatus or in another apparatus constructed as a system and read out one after another. In the sound data receiving process explained in FIG. 4, therefore, sound data is acquired by using a signal transmitting means other than the network, or directly read out from the storage device in the apparatus.

In the above embodiments, all sound data are provided from the outside. However, sound data may also be obtained by conversion in the apparatus. For example, it may be possible to receive text data and use this text data as part of sound output data by performing speech synthesis.

In the above embodiments, reception of metadata is periodically checked in the output format determination process. However, any arbitrary processing form by which an output format is determined in accordance with received metadata may be used. For example, event-driven processing which uses the arrival of metadata as an event may be used. In this case, the procedure is changed such that the processing from step S302 is performed for the event.

In the above embodiments, the process of acquiring each sound data is accomplished by an independent thread. However, this process may also be realized by the same thread as another process.

The above embodiments use PCM-encoded digital sound data. However, digital data using another encoding format may also be used.

In the above embodiments, metadata is expressed by an XML document. However, metadata may also be expressed by another data format. For example, pairs of attributes and attribute names may be enumerated. If metadata items are determined, a data format such as a CVS format in which items are fixed may be used.

In the above embodiments, an example of hardware is shown in FIG. 2. However, it may also be possible to use a logic circuit which executes a part or the whole of the processing performed by the sound data generating apparatus of each of the above embodiments.

Preferred embodiments of the present invention have been described above. However, the contents explained in these embodiments are applicable to each other without departing from the gist and object of the present invention.

The object of the present invention can also be achieved by supplying a storage medium (or a recording medium) storing program codes of software for implementing the functions of the above embodiments to a system or an apparatus, and reading out and executing the program codes stored in the storage medium by a computer (or a CPU or MPU) of the system or apparatus. In this case, the program codes read out from the storage medium implement the functions of the present invention, and the storage medium storing these program codes constitutes the invention. Further, besides the functions of the above embodiments are implemented by executing the readout program codes by the computer, the present invention includes a case where an operating system (OS) or the like running on the computer performs a part or the whole of actual processing in accordance with designations by the program codes and thereby implements the functions of the above embodiments.

Furthermore, the present invention also includes a case where, after the program codes read from the storage medium are written in a memory of a function extension board inserted into the computer or of a function extension unit connected to the computer, a CPU or the like of the function extension board or function extension unit performs a part or the whole of actual processing in accordance with designations by the program codes and thereby implements the functions of the above embodiments. When the present invention is applied to the above storage medium, the storage medium stores program codes corresponding to the flow chart shown in FIG. 3 explained earlier.

As many apparently widely different embodiments of the present invention can be made without departing from the spirit and scope thereof, it is to be understood that the invention is not limited to the specific embodiments thereof except as defined in the claims.

What is claimed is:

1. A sound data setting apparatus for setting an output manner of a plurality of sound data existing simultaneously to output sounds corresponding to the plurality of sound data, comprising:

acquiring means for acquiring metadata of the plurality of sound data, each of the metadata indicating an attribute of respective ones of the sound data: and setting means for setting an output manner of the plurality of the sound data existing simultaneously in accordance with a set of the metadata of the plurality of sound data.

2. A sound data generating apparatus for generating sound data to output sounds corresponding to a plurality of sound data existing simultaneously by a predetermined output manner, comprising:

acquiring means for acquiring metadata of the plurality of sound data, each of the metadata indicating an attribute of respective ones of the sound data;

setting means for setting an output manner of the plurality of sound data existing simultaneously in accordance with a set of the metadata of the plurality of sound data; and means for generating new sound data from the plurality of sound data on the basis of the set output manner.

3. The apparatus according to claim 2, wherein said setting means determines an output schedule of the plurality of sound data as the output manner.

4. The apparatus according to claim 2, further comprising means for storing rules of the output manner corresponding to the metadata, wherein said setting means sets the output manner in accordance with the rules.

5. The apparatus according to claim 4, wherein the rules are changeable.

6. The apparatus according to claim 2, further comprising means for holding the metadata, and means for holding the sound data.

7. The apparatus according to claim 2, wherein said acquiring means extracts the metadata from data containing the sound data and the metadata.

8. The apparatus according to claim 2, wherein said acquiring means acquires the metadata separately from the sound data, and said sound data generating apparatus further comprises means for acquiring, on the basis of the acquired metadata, data concerning the sound data pertaining to the metadata.

9. The apparatus according to claim 8, wherein the data concerning the sound data is sound data.

10. The apparatus according to claim 8, further comprising means for generating sound data on the basis of the data concerning the sound data.

11. The apparatus according to claim 2, wherein said setting means sets superposition of the sound data pertaining to different types of sounds, as the output manner.

12. The apparatus according to claim 11, wherein the types include music and a voice.

13. The apparatus according to claim 2, wherein said setting means sets switching between the sound data pertaining to different types of sounds, as the output manner.

14. The apparatus according to claim 2, wherein the output manner includes at least one of superposition of a plurality of sounds, switching between a plurality of sounds, and a sound output gain.

15. A sound data setting method of setting an output manner of a plurality of sound data existing simultaneously to output sounds corresponding to the plurality of sound data, comprising:

the acquisition step of acquiring metadata of the plurality of sound data, each of the metadata indicating an attribute of respective ones of the sound data; and the setting step of setting an output manner of the plurality of sound data existing simultaneously in accordance with a set of the metadata of the plurality of sound data.

16. A sound data generating method of generating sound data to output sounds corresponding to a plurality of sound data existing simultaneously by a predetermined output manner, comprising:

the acquisition step of acquiring metadata of the plurality of sound data, each of the metadata indicating an attribute of respective ones of the sound data;

the setting step of setting an output manner of the plurality of sound data existing simultaneously in accordance with a set of the metadata of the plurality of sound data; and the step of generating new sound data from the plurality of sound data on the basis of the set output manner.

17. The method according to claim 16, wherein the setting step comprises determining an output schedule of the plurality of sound data as the output manner.

18. The method according to claim 16, further comprising the step of storing rules of the output manner corresponding to the metadata, wherein the setting step comprises the step of setting the output manner in accordance with the rules.

19. The method according to claim 18, wherein the rules are changeable.

20. The method according to claim 16, further comprising the step of holding the metadata, and the step of holding the sound data.

21. The method according to claim 16, wherein the acquisition step comprises the step of extracting the metadata from data containing the sound data and the metadata.

22. The method according to claim 16, wherein the acquisition step comprises the step of acquiring the metadata separately from the sound data, and said sound data generating method further comprises the step of acquiring, on the basis of the acquired metadata, data concerning the sound data pertaining to the metadata.

23. The method according to claim 22, wherein the data concerning the sound data is sound data.

24. The method according to claim 22, further comprising the step of generating sound data on the basis of the data concerning the sound data.

25. The method according to claim 16, wherein the setting step comprises setting superposition of the sound data pertaining to different types of sounds, as the output manner.

26. The method according to claim 25, wherein the types include music and a voice.

27. The method according to claim 16, wherein the setting step comprises the step of setting switching between the sound data pertaining to different types of sounds, as the output manner.

28. The method according to claim 16, wherein the output manner includes at least one of superposition of a plurality of sounds, switching between a plurality of sounds, and a sound output gain.

29. A recording medium recording a program, for setting an output manner of a plurality of sound data existing simultaneously to output sounds corresponding to the plurality of sound data, allowing a computer to function as:

acquiring means for acquiring metadata of the plurality of sound data, each of the metadata indicating an attribute of respective ones of the sound data; and setting means for setting the output manner of the plurality of sound data existing simultaneously in accordance with a set of the metadata of the plurality of sound data.

30. A recording medium recording a program, for generating sound data to output sounds corresponding to a plurality of sound data existing simultaneously by a predetermined output manner, allowing a computer, to function as:

acquiring means for acquiring metadata of the plurality of sound data, each of the metadata indicating an attribute of respective ones of the sound data;

setting means for setting an output manner of the plurality of sound data existing simultaneously in accordance with a set of the metadata of the plurality of sound data; and means for generating new sound data from the plurality of sound data on the basis of the set output manner.

31. The medium according to claim 30, wherein said setting means determines an output schedule of the plurality of sound data as the output manner.

32. The medium according to claim 30, wherein said program comprises a program for allowing a computer to function as means for storing rules of the output manner corresponding to the metadata, and said setting means sets the output manner in accordance with the rules.

33. The medium according to claim 32, wherein the rules are changeable.

34. The medium according to claim 30, wherein said program comprises a program for allowing a computer to function as means for holding the metadata, and as means for holding the sound data.

35. The medium according to claim 30, wherein said acquiring means extracts the metadata from data containing the sound data and the metadata.

36. The medium according to claim 30, wherein said acquiring means acquires the metadata separately from the sound data, and said program comprises a program for allowing a computer to function as means for acquiring, on the basis of the acquired metadata, data concerning the sound data pertaining to the metadata.

37. The medium according to claim 36, wherein the data concerning the sound data is sound data.

38. The medium according to claim 36, wherein said program comprises a program for allowing a computer to function as means for generating sound data on the basis of the data concerning the sound data.

39. The medium according to claim 30, wherein said setting means sets superposition of the sound data pertaining to different types of sounds, as the output manner.

40. The medium according to claim 39, wherein the types include music and a voice.

41. The medium according to claim 30, wherein said setting means sets switching between the sound data pertaining to different types of sounds, as the output manner.

42. The medium according to claim 30, wherein the output manner includes at least one of superposition of a plurality of sounds, switching between a plurality of sounds, and a sound output gain.

* * * * *